Patented Nov. 26, 1935

2,022,245

UNITED STATES PATENT OFFICE 2,022,245

MONO-N-ALKANOL DERIVATIVE OF AROMATIC DI-AMINES AND POLY-AMINES

Erich Lehmann, Bitterfeld, Germany, assignor to General Aniline Works, Inc., New York, N. Y., a corporation of Delaware No Drawing. Application September 23, 1932, Serial No. 634,621. In Germany October 15, 1931

13 Claims. (Cl. 260—128)

My present invention relates to a process of manufacturing new N-substitution products of di- or polyamines of the benzene series and more particularly to those derivatives in which one amino group is substituted by the radicle —CH₂·CHOH·CH₂OH or

Further objects of my invention are the new compounds corresponding to the general formula

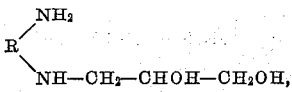

in which R means a phenylene radicle which may be substituted by halogen, alkyl, —NO₂, —O.alkyl or a further substituted or unsubstituted amino group.

It is known that N-monoalkanol derivatives can be made by condensing aromatic monamines with halogen-alkanols, such as monochlorhydrine. It is also known that diamines of which one amino group is mono-substituted are converted into the corresponding oxyalkyl derivatives by treatment with halogen-alkanols, the oxyalkyl radicle entering the primary amino group.

According to experience, the operation of substituting the hydrogen of the amino group of diamines or polyamines by, for instance, alkyl, acyl and so on, leads to mixtures of secondary and tertiary amines; at the same time, substitution of hydrogen atoms in several nuclear amino groups takes place.

By the present invention well-defined mono-N-alkanol derivatives of aromatic di- or polyamines are made by condensation of equimolecular proportions of the amine and a halogen-alkanol in the presence of a suitable solvent and an acid-binding agent. This fact is contrary to the experience referred to in the preceding paragraph and is surprising, inasmuch as the formation of a mixture of at least two N-substitution products was to be expected in the alkoxylation of aromatic diamines or polyamines.

The products obtained in accordance with the invention are unitary compounds and may serve as intermediate products for the manufacture of dyes and other valuable compounds.

The following examples illustrate the invention, the parts being by weight:—

*Example 1.*—108 parts of para-phenylene-diamine and 110 parts of α-monochlorhydrine are dissolved in 500 parts of methanol. At 10 to 15° C. a solution of 56 parts of potassium hydroxide in 200 parts of methanol is added. After stirring for about 8 hours, the potassium chloride which has precipitated is removed by filtration and the methanol is distilled. N-mono-(β.γ-dihydroxypropyl)-para-phenylenediamine is obtained in a yield of 177 parts, corresponding to 97 per cent of the theory.

*Example 2.*—143 parts of 2.4-diamino-chlorobenzene and 110 parts of α-monochlorhydrine are dissolved in 450 parts of methanol and there is then added a solution of 56 parts of potassium hydroxide in 200 parts of methanol. After stirring for about 8 hours, the potassium chloride is separated by filtration and the filtrate is worked up as indicated in Example 1. 213 parts of N-mono-(β.γ-dihydroxypropyl)-chloro-meta-phenylenediamine are obtained, corresponding to 93 per cent of the theory.

*Example 3.*—122 parts of 2.4-diamino-toluene are dissolved in 450 parts of methanol and mixed with 110 parts of α-monochlorhydrine. At about 5–10° C. a solution of 40 parts of sodium hydroxide in 250 parts of methanol is run into the solution and the whole is stirred for about 8 to 10 hours. The reaction product is worked up as indicated in Example 1. 180 parts of N-mono-β-hydroxyethyl-meta-toluylene-diamine are obtained, corresponding with 95 per cent of the theory.

*Example 4.*—123 parts of 1.2.4-triaminobenzene and 110 parts of α-monochlorhydrine are dissolved in 600 parts of methanol and a solution of 56 parts of potassium hydroxide in 200 parts of methanol is slowly added at about 5–10° C. After stirring for about 8 to 10 hours the reaction product is worked up as indicated in Example 1. 191 parts of N-mono-(β.γ-dihydroxypropyl)-1,2,4-triaminobenzene are obtained, corresponding with 97 per cent of the theory.

It is obvious that my invention is not limited to the foregoing examples or to the specific details given therein. Thus, for instance, instead of α-monochlorhydrine the corresponding β-monochlorhydrine may be used. Furthermore, other di- or poly-amines of the benzene series may be employed as starting materials. I enumerate, for instance, 1,3-dichloro-2,4-diaminobenzene, 1-chloro-6-nitro-2,4-diaminobenzene, 1-methoxy- or ethoxy-2,4-diaminobenzene, 1-chloro-6-methyl- (or methoxy or ethoxy)-2,4-diaminobenzene,1-methyl- or ethyl-6-chloro-2,4-diamino-benzene, 1,4-diamino-2-chloro- (or nitro or methoxy)-benzene, 1,2-diaminobenzene, 1,2 - diamino - 4 - chloro-(or nitro-)benzene and similar substituted diamines of the benzene series.

In the examples given above, methanol is indicated as an inert, organic solvent of the reacting ingredients. It may be substituted by ethanol or other aliphatic alcohols, aqueous alcohols, acetone, dioxan and similar organic solvents. Instead of a caustic alkali, I may generally use a fixed alkali, an oxide, a hydroxide or carbonate of the alkaline earth metals or magnesium oxide. A few simple comparative experiments should be made to determine the best kind of acid binding compound or of the solvent to employ with a particular diamine.

The new products obtainable according to my invention, are in the pure state crystalline compounds of basic character, which are easily soluble in water and alcohols, difficultly soluble in ether and insoluble in ligroin. With acids they form salts which likewise are distinguished by their outstanding high solubility in water.

What I claim is:—

1. The process which comprises acting upon a polyamine of the benzene series with a monochlorhydrine in the presence of an inert, organic solvent and an acid binding agent of the group consisting of oxides, hydroxides and carbonates of alkali metals and alkaline earth metals and magnesium oxide.

2. The process which comprises acting upon a diamine of the benzene series with a monochlorhydrine in the presence of an inert, organic solvent and an acid binding agent of the group consisting of oxides, hydroxides and carbonates of alkali metals and alkaline earth metals and magnesium oxide.

3. The process which comprises acting upon a diamine of the benzene series with an α-monochlorhydrine in the presence of an inert, organic solvent and an acid binding agent of the group consisting of oxides, hydroxides and carbonates of alkali metals and alkaline earth metals and magnesium oxide.

4. The process which comprises acting upon a diamine of the benzene series with an α-monochlorhydrine in the presence of methanol and an acid binding agent of the group consisting of oxides, hydroxides and carbonates of alkali metals and alkaline earth metals and magnesium oxide.

5. The process which comprises acting upon a diamine of the benzene series with an α-monochlorhydrine in the presence of methanol and an alkali metal hydroxide.

6. The process which comprises acting upon a diamine of the general formula

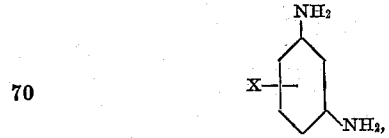

wherein X means hydrogen, halogen, alkyl, O-alkyl, —NO₂, with α-monochlorhydrine in the presence of an inert solvent and an acid binding agent of the group consisting of oxides, hydroxides and carbonates of alkali metals and alkaline earth metals and magnesium oxide.

7. The process which comprises acting upon a diamine of the general formula

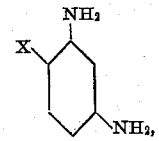

wherein X means hydrogen, halogen, alkyl, O-alkyl, —NO₂, with α-monochlorhydrine in the presence of an inert solvent and an acid binding agent of the group consisting of oxides, hydroxides and carbonates of alkali metals and alkaline earth metals and magnesium oxide.

8. The compounds corresponding to the general formula

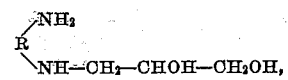

wherein R means a radicle of the benzene series, which may be substituted by halogen, alkyl, O-alkyl, NH₂, NO₂, said compounds of basic character being easily soluble in water and alcohols, difficultly soluble in ether and insoluble in aliphatic hydrocarbons, and forming salts with acids which likewise are easily soluble in water.

9. The compounds corresponding to the general formula

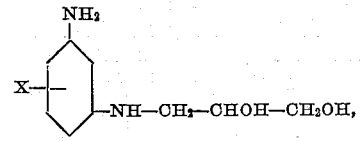

wherein X means hydrogen, halogen, alkyl, O-alkyl, NH₂, NO₂, said compounds of basic character being easily soluble in water and alcohols, difficultly soluble in ether and insoluble in aliphatic hydrocarbons, and forming salts with acids which likewise are easily soluble in water.

10. The compounds corresponding to the general formula

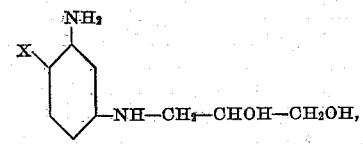

wherein X means hydrogen, halogen, alkyl, O-alkyl, NH₂, NO₂, said compounds of basic character being easily soluble in water and alcohols, difficultly soluble in ether and insoluble in aliphatic hydrocarbons, and forming salts with acids which likewise are easily soluble in water.

11. 1-amino-3-dihydroxy-propylamino-6-chlorobenzene of the formula

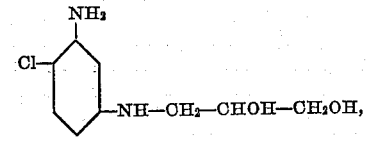

said substituted diamine being easily soluble in water and alcohols, difficultly soluble in ether and insoluble in aliphatic hydrocarbons, and forming salts with acids which likewise are easily soluble in water.

12. 1-amino-3-dihydroxy-propylamino-6-methoxybenzene of the formula

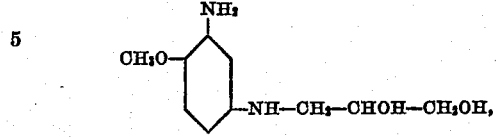

said substituted diamine being easily soluble in water and alcohols, difficultly soluble in ether and insoluble in aliphatic hydrocarbons, and forming salts with acids which likewise are easily soluble in water.

13. 1-amino-3-dihydroxy-propylamino-6-ethylbenzene of the formula

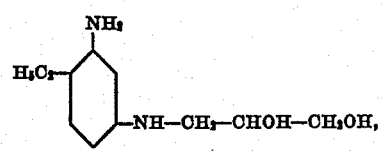

said substituted diamine being easily soluble in water and alcohols, difficultly soluble in ether and insoluble in aliphatic hydrocarbons, and forming salts with acids which likewise are easily soluble in water.

ERICH LEHMANN.